Figure 1:
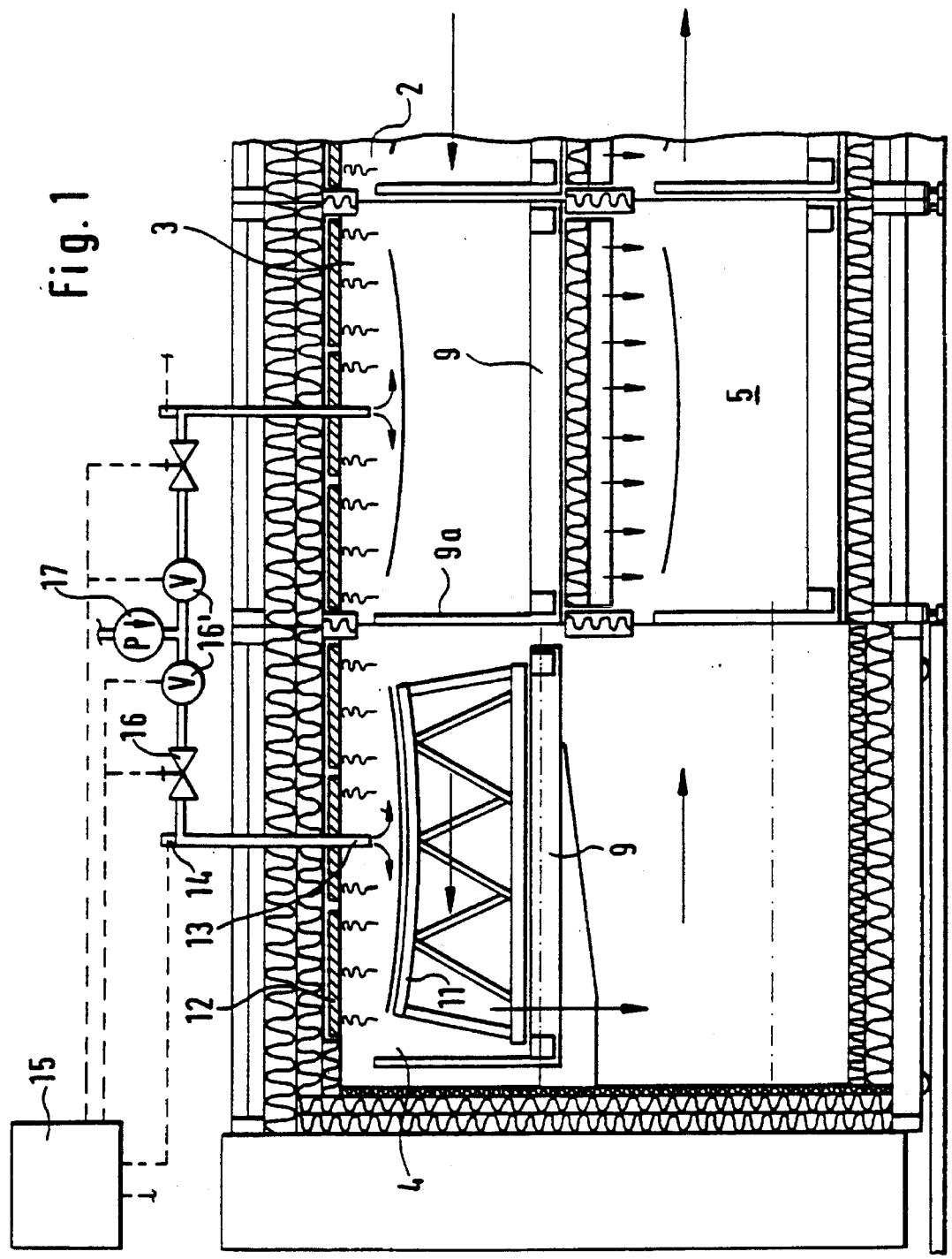

United States Patent

Yli-Vakkuri et al.

[11] Patent Number: 5,472,469
[45] Date of Patent: Dec. 5, 1995

[54] METHOD OF BENDING GLASS SHEETS

[75] Inventors: Erkki Yli-Vakkuri; Arto Kaonpaa; Tapio Salonen; Jukka Nikkanen, all of Tampere, Finland

[73] Assignee: Tamglass Engineering OY, Tampere, Finland

[21] Appl. No.: 237,996

[22] Filed: May 4, 1994

Related U.S. Application Data

[63] Continuation of Ser. No. 10,334, Jan. 28, 1993, abandoned.

[30] Foreign Application Priority Data

Oct. 15, 1992 [FI] Finland ................................. 924666

[51] Int. Cl.$^6$ ................................. C03B 23/025
[52] U.S. Cl. ................................. 65/107; 65/104; 65/106; 65/268; 65/273; 65/285
[58] Field of Search ................................. 65/104, 107, 268, 65/273, 285, 106

[56] References Cited

U.S. PATENT DOCUMENTS

| | | |
|---|---|---|
| 2,794,300 | 6/1957 | Golightly ................................. 65/107 |
| 2,967,378 | 1/1961 | Jones et al. |
| 4,497,645 | 2/1985 | Peltonen ................................. 65/107 |
| 4,755,204 | 7/1988 | Boardman et al. ................................. 65/107 |
| 4,986,842 | 1/1991 | Peltonen ................................. 65/104 |
| 5,009,691 | 4/1991 | Aratani ................................. 65/106 |
| 5,079,931 | 1/1992 | Lehto et al. ................................. 65/273 |
| 5,173,102 | 12/1992 | Weber et al. ................................. 65/273 |

FOREIGN PATENT DOCUMENTS

| | | |
|---|---|---|
| 0370310 | 5/1990 | European Pat. Off. . |
| 0486952 | 5/1992 | European Pat. Off. . |

Primary Examiner—David L. Lacey
Assistant Examiner—Sean Vincent
Attorney, Agent, or Firm—Burns, Doane, Swecker & Mathis

[57] ABSTRACT

A method and a furnace for bending glass sheets. Glass sheets are heated to a bending temperature by supporting them on a mould (11) and carrying them from one heating station to another. In a bending station (4), the glass sheet is heated for effecting a desired bending partially or entirely through the action of gravity. During a bending operation, the temperature distribution of a glass sheet is subjected to the action of convection blasting. By focusing the blast on the mid-section of a glass sheet it is possible to create a progressively curving pocket.

8 Claims, 2 Drawing Sheets

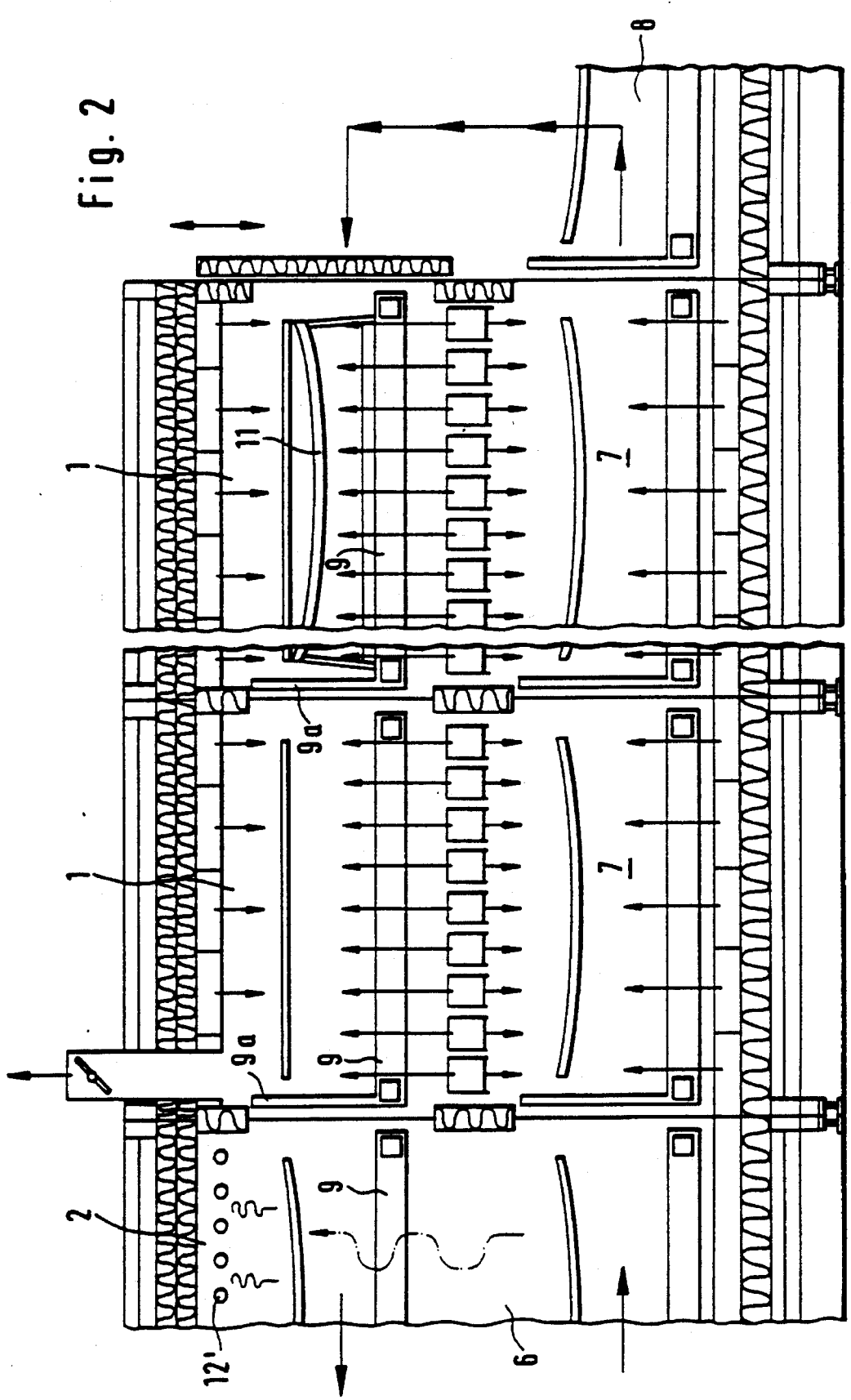

METHOD OF BENDING GLASS SHEETS

This application is a continuation of application Ser. No. 08/010,334, filed Jan. 28, 1993 now abandoned.

The present invention relates to a method for bending glass sheets, in which method a cold, non-bent glass sheet is placed on a mould, the mould and the glass sheet supported thereby are carried on a mould wagon from a heating station to another, the glass sheet supported by the mould is heated in each heating station until the glass reaches a bending temperature, the pre-bent glass sheet supported by the mould is carried to a bending station and the glass sheet is heated in the bending station so as to effect a desired bending partially or entirely through the action of gravity.

The invention relates also to a bending furnace for glass sheets, comprising a number of successive heating stations, a bending station, a number of successive cooling stations below said heating stations, moulds for supporting glass sheets during the course of heating, bending and cooling, and wagons for carrying the moulds from one station to another.

The above type of method and furnace apparatus for bending glass sheets are prior known from the Applicants' Patent publications U.S. Pat. No. 4,497,645 and U.S. Pat. No. 4,986,842. This type of furnace is especially intended for bending laminated windshields gravitationally by means of a ring mould. Naturally, press bending can also be used to assist gravitational bending. When bending typical windshield profiles, heating resistances are used to make sure that the glass sheet has a heat distribution which contributes to the formation of a desired bending shape. For example, due to the steeper bending curves formed therein, the end sections are subjected to more radiation heat than the mid-section which remains relatively flat. It is prior known from U.S. Pat. No. 5,009,691 and 4,441,907 to employ forced convection in a heating step preceding the bending. Neither of these publications says anything about forced convection at the time a glass sheet is already in the mould where it is heated and bent. It is prior known from U.S. Pat. No. 2,967,378 to employ the local application of radiation heat to a glass sheet to be bent in a mould.

However, there has developed a need to produce also such bending shapes, wherein the mid-section of a glass sheet bends to a progressive or uniformly extending curve without the mid-section remaining any flatter than the rest of a glass sheet. Such a shape is preferred e.g. for the reason that the windshield wipers operate more efficiently as their pressure on the glass surface remains more uniform. The aerodynamic reasons can also be a basis for preferring a progressive bending curve. This is not possible to achieve by means of resistance fields used for bending conventional windshield configurations. In principle, it would be possible to alter the resistance field configuration and the disposition of resistances in a manner that one and the same apparatus can be used for bending both conventional windshield shapes and shapes with the mid-section bent to a progressive curve. However, the re-arrangement of resistance fields for this purpose is an inconvenient and expensive operation. The shape control becomes more difficult as the pocket to which the entire glass sheet should be bent becomes deeper and the surface area of a glass sheet becomes larger.

An object of the invention is to provide a method and a furnace assembly of the above type which, in addition to conventional windshield shapes, are also capable of effecting intensified bending of the mid-section of a glass sheet in view of producing various bending shapes without having to resort to the structural re-arrangement of resistance fields.

This object is achieved by means of a method of the invention in a manner that, during the course of heating and bending effected in a bending station, the heating of a glass sheet is intensified by the application of convection blast.

The convection blast can be focused to any section at which the bending to form a pocket should be intensified. In a typical case, the convection blast is focused on the mid-section of a glass sheet for bending it to a progressive curve.

Convection blast can be maintained through the entire bending operation, allowing for the use of a very weak blast which does not locally overheat the glass surface so as to form a "heat lens".

If desired, convection blast can also be used in a prebending station preceding the bending station. In some cases it may be sufficient to just employ convection blast for a short period during a bending operation or towards the end thereof.

A furnace or leer assembly of the invention is characterized in that the bending station is provided with a convection-air blast pipe extended through the thermally insulated ceiling or wall and having its blasting orifice opening on top of the mid-section or corner sections of a glass sheet placed in the bending station.

The convection-air blast pipe can be fitted with a pyrometer for measuring the glass temperature. Thus, the blasting action can be controlled on the basis of a temperature measurement effected by the pyrometer.

One exemplary embodiment of the invention will now be described in more detail with reference made to the accompanying drawings, in which FIG. 1 shows a vertical section through the outlet end (bending station) of a furnace assembly of the invention and FIG. 2 shows a vertical section through the inlet end of the same furnace assembly.

The furnace or leer includes a number of successive heating sections or stations 1, 2, 3. A cold glass sheet is supported by a bending mould 11 and carried into a first furnace station 1. The mould 11 along with its glass sheet is carried forward from one station to the next by means of a mould wagon 9, provided with an end wall 9a for separating the successive stations from each other. In first stations 1, the glass sheet is mainly heated by the application of forced convection, whose thermal energy is obtained from a bent glass sheet which is in the process of cooling in lower cooling stations 7, as described in more detail in the Applicants' U.S. Pat. No. 4,986,842. The wagon 9 is moved from station 8 to station 1 and, after travelling through the furnace, exits the furnace from a lower cooling station 7. In stations 1, the share of forced convection from the glass sheet heating effect is typically 90% and the share of radiation is 10%. The number of heating stations 1 based on the recovery of heat can be 3 to 6 and a glass sheet therein reaches the temperature of 230° C. to 300° C. prior to advancing into a preheating station 2 downstream. In preheating stations 2, the heating is partially effected by means of heating resistances 12' and partially by convection heat received through the floor and/or around the edges of carrier wagons 9 and obtained from glass sheets which are in the process of cooling in cooling stations 6 below. In stations 2, the share of radiation is e.g. 40% and that of convection heat is 60%. The number of preheating stations 2 is typically 3 to 6. From preheating stations 2 the glass sheet advances into a prebending station 3 as the glass temperature is e.g. appr. 530° C. to 550° C. In prebending station 3, the temperature is raised by a few tens of degrees, which already causes a slight bending of the glass sheet. Finally, the glass sheet is carried into an actual bending station 4, wherein its temperature is raised e.g. within a temperature range of 590° C. to 635° C. At its bending temperature, the glass is highly sensitive to temperature fluctuations so that a change of even just a few degrees in the temperature of a glass sheet has a major effect on its susceptibility to bending. In bending station 4, the transfer of heat to the glass is typically such that the share of radiation is 90% and that of convection is 10%. Since the share of convection is small and temperature is high, it is plausible to conclude that even a very slight increase in convection blast can have a substantial effect on the change of glass sheet temperature within the area on which the convection blast is focused.

It has been realized in the invention that, in addition to a temperature distribution achieved by means of resistances, convection blasting can be used to provide a more diversified range of shapes that can be bent in a controlled manner. Particularly, there has been a need for bending glasses having a rather large surface area in view of bending the mid-section thereof to a progressive curve. For this purpose the invention includes a convection-air blasting pipe 13, which has been extended through the thermally insulated ceiling of station 4 and between heating resistances 12 to the proximity of the top surface of a glass sheet placed in the bending station. The distance between the bottom end of pipe 13 and the surface of a glass sheet can be within the range of 10 to 20 cm. The diameter of pipe 13 can be e.g. from 8 to 12 mm. In a typical case, pipe 13 is used to blow convection air very gently throughout the entire bending operation essentially over the mid-section of a glass sheet. The blowing rate is less than 0.1 l/s and typically within the range of 0.1 to 0.3 l/s. A very gentle blowing (e.g. 0.1 l/s) can be used also for conventional bending shapes by making the necessary modifications to the program for controlling the temperature distribution of a resistance field.

A pyrometer 14 mounted on pipe 13 can be used for measuring the temperature of bending glass. According to a predetermined program, a control unit 15 can be provided for controlling valves 16 and 16' on the basis of temperature measurement. Valve 16 is a control valve for the regulation of flow rate and valve 16' is an on/off-valve. Naturally, both valve types can be used separately or together for controlling the blowing time or rate. In a normal case, the blow control or on/off switching is not required at all for the duration of bending a single glass sheet but only when the type of glass sheet is changed. Thus, a typical case involves the use of a continuous and constant blow, and the distribution of heat transfer is adjusted by adjusting the temperature distribution of a resistance field. The adjustment concerns primarily as to when and how many of the mid-section resistances are switched off at the final stage of heating.

A similar convection-air blasting system can also be arranged in preheating station 3. The creation of a necessary convection blasting requires a very low-power pump 17. Since the amount of air to be blown or blasted is very small, the blast air can be obtained directly from the room surrounding the furnace.

A convection blasting of the invention serves to achieve, in addition to controlling a more extensive bending area, also an increase in capacity since the convection blasting makes the bending operation a little bit quicker. This is not actually a result of the increase of heat transfer effected by convection but it is due to the fact that, in many cases, the total amount of radiation heat can be increased.

The location of a blasting spot can have an effect on the shape a glass sheet is bending to. Along with or in addition to the mid-section, the blasting can be focused on the corner sections of a glass sheet, which require sharp bends in several directions. If desired, the blowing spot of blast pipe 13 can be adapted to be maneuverable in vertical and/or horizontal direction. The manipulation of a blasting spot can be effected from outside the furnace mechanically by means of a suitable operating leverage. Naturally, it is also possible to use blasting from below, which is focused on the bottom surface of glass. However, a typical case involves the use of a stationary blasting spot above the mid-section of a glass sheet and the shape is provided by means of a program controlling the distribution of radiation heat. Blasting is not the only way to produce controllably forced flow of air in the vicinity of the glass sheet. In some cases also suction or mechanically produced whirling of air could be used.

We claim:

1. A method for bending glass sheets, comprising the steps of:

placing an unheated, unbent glass sheet on a mould;

moving the glass sheet on the mould through preheating means;

preheating the glass sheet on the mould with the preheating means so that a temperature of the glass sheet is raised to a bending temperature;

moving the preheated glass sheet on the mould into a bending station;

heating the glass sheet on the mould with convection and radiation heating means in the bending station;

bending, at least partially through gravity, the preheated glass sheet on the mould in the bending station as it is heated by the convection and radiation heating means;

controlling a temperature distribution of the glass sheet on the mould in the bending station with a forced flow of air applied to an area around the glass sheet, the forced flow of air forming at least a part of the convection heating means;

maintaining the forced flow of air at a substantially constant rate; and adjusting a distribution, on the glass sheet on the mould, of heat from the radiation heating means.

2. A method as set forth in claim 1, comprising the further step of further applying the forced flow of air to the area around the glass sheet while the glass sheet is moved through the preheating means.

3. A method as set forth in claim 1, comprising the further steps of focussing the forced flow of air on a top surface and a mid-section of the glass sheet such that the forced flow of air intensifies bending of the mid-section relative to end sections of the glass sheet, and bending the mid-section of the glass sheet in a progressive curve with the focused forced flow of air.

4. A method as set forth in claim 1, wherein the forced flow of air is applied to an area around the glass sheet when the temperature of the glass sheet is within the range of 530° C. to 635° C.

5. A method as set forth in claim 1, comprising the further step of focussing the forced flow of air on corner sections of the glass sheet.

6. A method as set forth in claim 1, comprising the further step of producing the forced flow of air by blasting a desired amount of air into the bending station at a predetermined location adjacent to the glass sheet.

7. A method as set forth in claim 1, comprising the further step of focusing the forced flow of air on a top surface and the mid-section of the glass sheet being bent.

8. A method as set forth in claim 1, comprising the further step of bending the glass sheet in a progressive curve by intensifying bending of a mid-section of the glass sheet relative to end sections of the glass sheet with the forced flow of air.

* * * * *